(12) United States Patent
Joyce et al.

(10) Patent No.: US 8,468,571 B2
(45) Date of Patent: Jun. 18, 2013

(54) ENABLING TRICK PLAYS DURING VBR PLAYBACK OF A CBR TRANSMITTED MEDIA FILE

(75) Inventors: Gerald Joyce, Newton, MA (US); Chris Brown, Warrington, PA (US); Michael Patrick, Assonet, MA (US); John Ulm, Pepperell, MA (US)

(73) Assignee: General Instrument Corporation, Horsham, PA (US)

( * ) Notice: Subject to any disclaimer, the term of this patent is extended or adjusted under 35 U.S.C. 154(b) by 1342 days.

(21) Appl. No.: 11/962,986

(22) Filed: Dec. 21, 2007

(65) Prior Publication Data

US 2009/0161765 A1 Jun. 25, 2009

(51) Int. Cl.
*H04N 7/173* (2011.01)
(52) U.S. Cl.
USPC .................. 725/90; 725/86; 725/87; 725/93; 725/94; 725/95
(58) Field of Classification Search
USPC .................................................. 725/86–104
See application file for complete search history.

(56) References Cited

U.S. PATENT DOCUMENTS

| 6,040,866 A | 3/2000 | Chen et al. |
| 6,996,129 B2 | 2/2006 | Krause et al. |
| 2002/0145611 A1 | 10/2002 | Dye et al. |
| 2006/0126667 A1* | 6/2006 | Smith et al. ................... 370/486 |
| 2007/0053513 A1 | 3/2007 | Hoffberg |

OTHER PUBLICATIONS

PCT International Search Report, Re: PCT Application #PCT/US08/86431 Dec. 11, 2008.
V. Janardhan "Peer Assisted VoD for Set-Top Box Based IP Network".
McManus, Jean M., et al., "Video on Demand over ATM: Constant-Rate Transmission and Transport", IEEE Journal on Selected Areas in Communications, vol. 14, No. 6, Aug. 1996.

* cited by examiner

*Primary Examiner* — Nicholas Corbo
(74) *Attorney, Agent, or Firm* — Lori Anne D. Swanson (57) ABSTRACT

A method and system for enabling trick plays during a variable bit rate (VBR) playback of a media file transmitted to a user media device as a constant bit rate (CBR) flow includes determining a plurality of access points within the media file. The media file is configured to be played back from each of the plurality of access points. A minimum buffer value is calculated for each of the plurality of access points. The minimum buffer value identifies a minimum amount of the media file to transmit to the user media device before beginning playback of the media file from each of the plurality of access points to substantially ensure that the media file is configured to be played back from each of the plurality of access points continuously and uninterruptedly at a variable bit rate.

17 Claims, 5 Drawing Sheets

ENABLING TRICK PLAYS DURING VBR PLAYBACK OF A CBR TRANSMITTED MEDIA FILE

BACKGROUND

Recently, multiple system cable operators (MSOs) have been transporting ever increasing numbers of variable bit rate (VBR) video. These VBR videos have been delivered primarily over Internet Protocol (IP) networks and mainly viewed on personal computers (PCs). It is very likely that these IP video providers will become more popular and will increase the durations and the bandwidths of these VBR videos. The VBR videos are also likely to be delivered to IP enabled set-tops and viewed on larger screens.

IP video is encoded and delivered differently from the usual cable company provided Video on Demand (VoD) provided over hybrid-fiber coaxial (HFC) networks. IP video is generally encoded as VBR and stored as a VBR file accessible through the content provider's web site. When a subscriber selects such a VBR video, a download is started, usually using a Transmission Control Protocol (TCP) session. A certain amount of the VBR video is buffered at the decoder (the receiving PC). The VBR video then begins to play, while the rest of the VBR video file is downloaded. The download over TCP can be at a constant bit rate (CBR) or at a VBR. The amount of video material in the decoder buffer can be substantial. Since the playback begins before the download has finished, the basic requirement is that the buffer not empty during the video playback. One important feature to recognize here is that the use of the buffer decouples the transmission rate of the video from the playback rate of the video. That is, the video may be played back at a different rate than the rate at which the video is transmitted over the network.

It is important to distinguish the system for VBR video intended for transmission over an IP network, described above, with the usual constant bandwidth CBR digital video used in some cable systems for transmission over an HFC network. For purposes of allocating bandwidth in a cable system using an HFC network, it is useful to allocate a fixed or constant bandwidth to each video flow. These video flows are carried on quadrature amplitude modulation (QAM) carriers with fixed bandwidths. In this way, a known number of video flows may share a QAM carrier.

Additionally, in a typical HFC cable system, VoD is based on digital transmission to a set-top box (STB) that has only minimal buffering. Often, the STB buffer is on the scale of a second or less. Because of the small size of STB buffers, the video transmission rate in HFC networks can be approximately equal to the video playback rate. The playback rate is by definition equal to the encoding rate. Therefore, in order for a video to be transmitted at a constant bit rate, the video must also be encoded at a constant bit rate. This is how conventional digital video transmitted over HFC cable systems is handled. The video is encoded at a CBR, it is stored in a server, and it is transmitted at a CBR over the HFC network to a STB, which may have a relatively small amount of buffering capacity. Generally, the playback of the video is also at a CBR. In this way it is possible to allocate the bandwidth on a QAM carrier to several video flows.

There is a problem, however, with encoding video at a constant bit rate. The complexity of the images within a video will inevitably vary. In order to maintain a consistent accuracy or fidelity in the more complex images, the bandwidth of the encoded video must also change over time as the complexity of the image varies. This results in VBR videos having different levels of data required to encode the different images. For instance, high definition VBR videos can reach instantaneous rates in excess of 16 Mbps for MPEG2 compression and in excess of 8 Mbps for MPEG4 Advanced Video Coding compression.

Due to the uneven bandwidth utilizations associated with the transmission of VBR videos, it would be difficult for the MSOs to transmit VBR flows to conventional STBs having small buffers. Due to the small buffers in conventional STBs, both the encode/decode rates and the transmission rates would have to be equal, and would have to both be VBR. Further, it is difficult to achieve a high average channel utilization for multiple VBR video flows. For instance, situations often arise where the total bandwidth for the multiple VBR video flows exceeds the capacity of the channel, which substantially limits the number of VBR video flows that are transmitted over the channel. In addition, if the average of the sum of the instantaneous VBR video flows is close to the capacity of the channel, there may be unacceptable delays in some of the video packets, degrading the operation of the video decoders. A proposed solution is channel bonding, which increases bandwidth to improve statistical multiplexing of video flows; however, channel bonding is oftentimes prohibitively expensive to implement.

To enable CBR transmission, CBR encoding is also required in typical cable systems. Therefore, in a typical digital video-based VOD system, the video is forced to be CBR encoded. This has led to capping, or artificially limiting the video bandwidth during encoding. In this way, the video can then be transmitted as a CBR flow. Unfortunately, capping the video bandwidth at a CBR encoding will result in a degradation of the video quality for the more complex images, which cannot be fully encoded within the bandwidth cap.

Figure 1A:
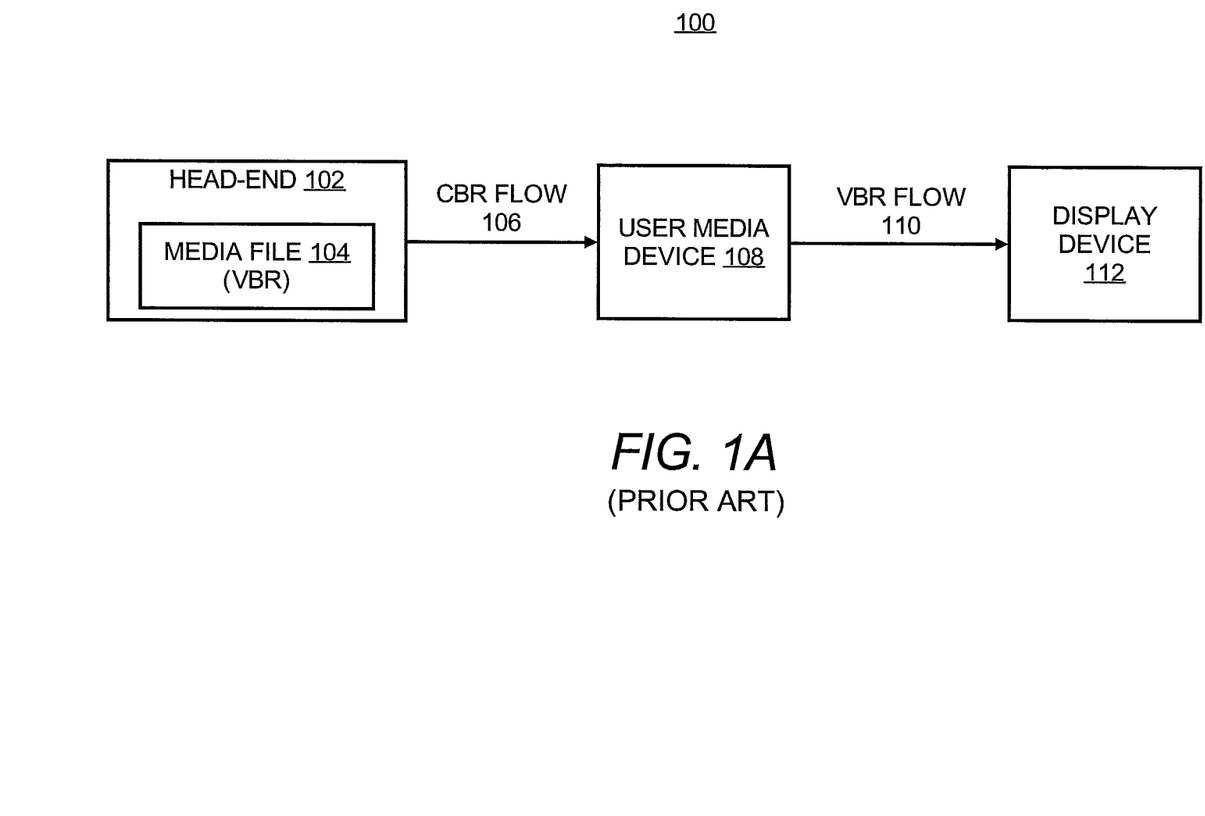
FIG. 1A illustrates a conventional system for transmitting a VBR media file as a CBR flow.

With respect to FIG. 1A, there is shown a block diagram of a conventional system 100 for sending VBR videos as a CBR flow. The system 100 may represent an HFC and/or an Internet Protocol (IP) network and, thus, includes a head-end 102, a user media device 108, and a display device 112. The head-end 102 includes any reasonably suitable device or combination of devices for receiving and/or storing media content and transmitting the media content downstream in a network, as is known in the art. As FIG. 1A shows, the head-end 102 contains media files 104, which are stored in a VBR format. Thus the encoding can be of a high fidelity and not subject to any arbitrary bandwidth limits in the video decode or playback rate. The video playback rate equals the encode rate which may not be equal to the video file download or transmission rate. The media file 104 may include any form of media content including videos, such as movies, television programs, etc.

The media file 104 is transmitted downstream under a CBR flow 106 to a user media device 108. The CBR flow 106 may be sent over any fiber and/or coaxial cables, such as a DOCSIS channel. Because, the media file 104 is sent as a CBR flow 106, the bandwidth at which the media file 104 is transmitted is capped, as described in greater detail below with respect to FIG. 1B. The user media device 108 includes, for instance, an STB, a digital video recorder (DVR), a modem, or a computing device. Generally speaking, the user media device 108 buffers and/or stores the media file 104 and plays back the media file 104 under a VBR flow 110 to the display device 112, which includes a television or monitor. In this manner, the media file 104 is transmitted to a subscriber's premises using the benefits of a bandwidth-capped CBR flow, yet the media file 104 is viewed on the display device 112 at full VBR quality.

Figure 1B:
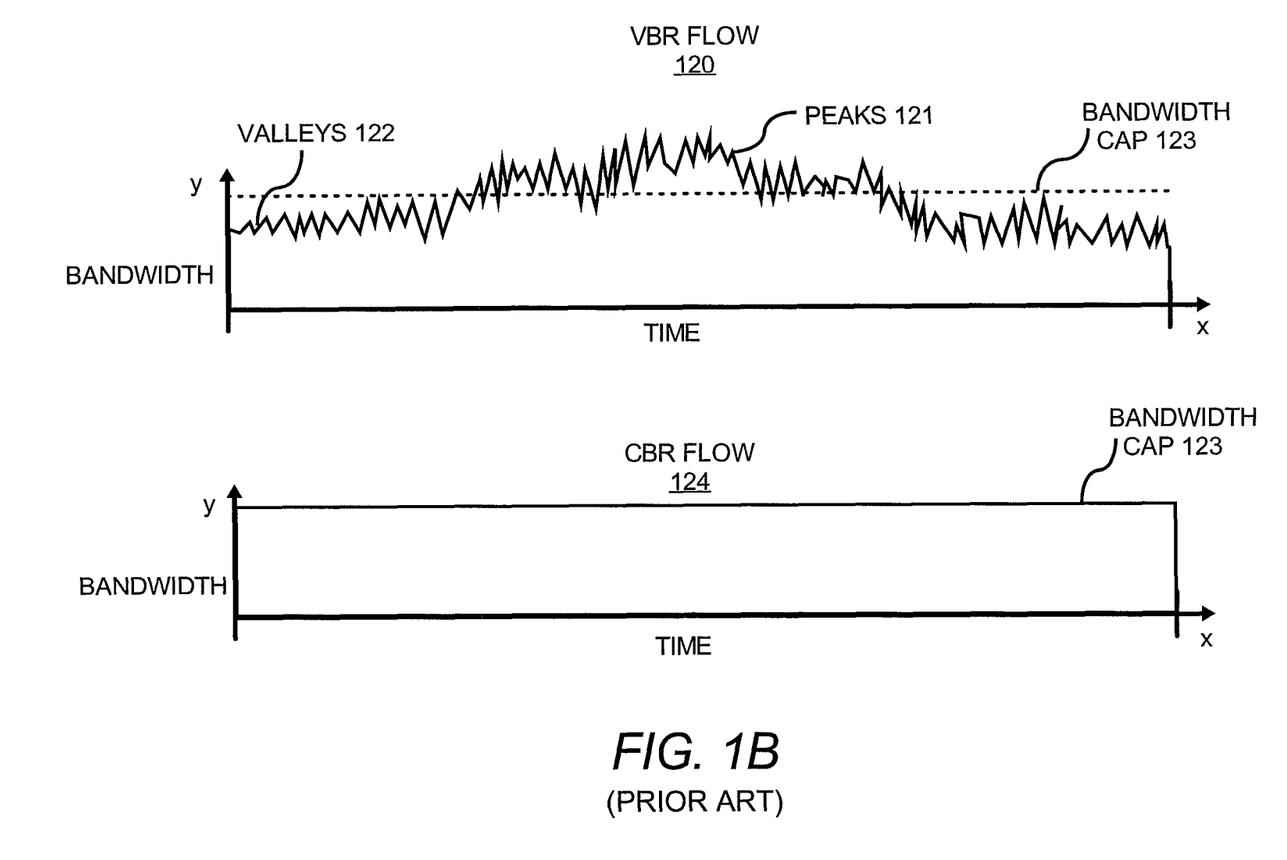
FIG. 1B illustrates a conventional media file transmitted as both a VBR flow and a CBR flow.

With respect now to FIG. 1B, there is shown a graphical representation of media content transmitted as both a VBR flow 120 and a CBR flow 124. For example, the media content shown in FIG. 1B may represent the media file 104, or a portion thereof, described above, with respect to FIG. 1A. It is important to note that the video is encoded in a VBR format with no limits or caps on the encode bandwidth. By definition, the instantaneous encode rate, playback rate, and decode rate are always equal to each other. In this case the encoding is VBR. For the portions of the video that are more complex, the encode/decode bandwidth will be higher. The x axes of the graphs represents time while the y axes of the graphs represent an amount of bandwidth required to transmit the media file 104. For instance, the y axes may be measured in a number of bytes of data.

The upper graph of FIG. 1B shows the media file 104 transmitted as a VBR flow 120. Here the video file transmission rate is equal to the encode/playback rate. This would be the case where the decoder has a minimal buffer capacity. In the VBR flow 120, the media file 104 has a series of peaks 121 and valleys 122. The peaks 121 represent portions of the media content within the media file 104 that requires large amounts of data, such as action scenes, explosions, etc., which may have a wide variety of colors, color changes, scene changes, etc. The valleys 122 represent portions of the media content within the media file 104 that requires relatively smaller amounts of data.

The lower graph shows the same media file 104 transmitted as a CBR flow 124. Here the video file transmission rate is made unequal to or is decoupled from the video encode/decode rate. This approach requires a relatively larger buffer in the STB.

As described above, transmitting the VBR encoded media file 104 as a VBR flow 120 consumes bandwidth and limits the number of video flows that may be transmitted over a network because of the extra bandwidth required for transmission of the peaks 121. In order to enable greater number of simultaneous video flows, the VBR encoded media file 104 is sent as the CBR flow 124.

In some systems, the video is encoded not as VBR but as CBR. In this way, the CBR encoded video file may be also transmitted as a CBR flow over the network to a conventional set-top that has a minimal buffer. However, in this encoding, the portions of the video that are highly complex will be artificially capped in their bandwidth. In the context of FIG. 1B, the peaks 121 that exceed the bandwidth cap 123 are essentially cut-off, which often results in a decrease in quality of the media file 104 playback.

To overcome this loss of video quality the video can be encoded not as CBR, but rather as VBR content. The file is then downloaded as a CBR flow 124, often using protocols such as TCP/IP. In this case, the encode/decode time scale is decoupled from the file download. The net result is that the portions of the media file 104 which exceed the bandwidth cap 123 are redistributed to other portions of the media file 104 that are below the bandwidth cap 123. The bandwidth cap 123 thus represents the average bandwidth of the VBR media file 104. As a result, the entire media file 104, including the peaks 121 exceeding the bandwidth cap 123, are transmitted as the CBR flow 124 without having to perform a transcoding and/or transrating process, which may degrade the quality of the media file 104. The media file 104 is received by the user media device 108, reconfigured to its original VBR format, and played back to the display device 112 at full VBR picture quality.

While this solution allows a VBR media file to be transmitted as a CBR flow 124, other problems that limit a user's interactivity with the media file 104 remain. For example, the technique described above of sending a VBR media file as the CBR flow 124 does not allow for trick plays in the playback of the media file 104. Trick plays include fast forwarding and skipping to various points in the media file 104, which have not been downloaded or buffered to the user media device 108. For instance, trick plays include skipping to, or otherwise selecting, a different chapter in a movie. In current systems for transmitting a VBR media file as a CBR flow, an attempt to execute a trick play may result in interruption of the play back of the media file 104 causing choppy playback, delays in playback, and blank screens shown on the display device 112, thus creating an unpleasant viewing experience.

Therefore, it would be beneficial to allow for uninterrupted VBR playback of a media file while enabling trick plays in a system transmitting VBR video content as a CBR flow, without suffering from the disadvantages associated with conventional VBR video transmission techniques.

BRIEF DESCRIPTION OF THE DRAWINGS

Embodiments are illustrated by way of example and not limited in the following Figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Embodiments of systems and methods described herein enable the use of trick plays during the VBR playback of a media file. The terms "media file," as used herein, refer to a contiguous piece of media content, which may be ordered by and transmitted to a user in its entirety. For example, a media file may include a movie or an episode of a television program, which is intended to be viewed in its entirety.

The media file may be transmitted to a user media device as a CBR flow and then played back on a display device as a VBR flow in a system substantially similar to the system 100 depicted in FIG. 1A, described above. As such, the media file 104 may be transmitted over an HFC and/or an IP network. For example, the media file 104 may be transmitted over an HFC network via one or more MPEG2 Transport Streams, via IP over DOCSIS, or the like. In one embodiment, the media file 104 may be requested by a user or subscriber of cable and/or Internet media services through a VoD service. As is generally known to those of ordinary skill in the art, VoD service may be defined as a service in which users are able to request and receive selected video content at desired times, that is, not following a regular programming schedule. In one regard, VoD service may provide a unicast of the selected video content to a user because the user controls the time at which the selected video content is received.

The terms "trick play" encompass selection of an access point within the media file 104 other than the beginning of the media file 104, where the selected portion of the media file 104 has not previously been downloaded to or buffered on the user's media device 108. The terms "access point" refer to any place within a media file 104 from which playback of the media file 104 may begin. Trick plays include fast forward commands, skip commands, and access point selections, etc. For instance, a user may "blindly" skip through the media file 104 by selecting a skip or fast forward command. The skip is blind because the user may be unaware of the precise access point to which the media file 104 is skipped. In other embodiments, a user may select from a plurality of access points. For instance, the user may be presented with a menu of predetermined access points, such as chapters or scenes within the media file 104. A person having ordinary skill in the art will appreciate that the media file 104 may have any reasonably suitable number of access points, which may be determined by any reasonably suitable means. Therefore, the access points may be randomly determined, set at predetermined intervals or durations, or may correspond to particular points within the media file 104, such as the beginning of a scene, a scene transition, and the like.

Trick plays are not currently enabled in conventional systems which transmit a VBR media file, such as the media file 104, as a CBR flow because a minimum amount of the media file 104 must be buffered to the user media device 108 in order to ensure that the buffer does not empty during playback of the media file 104. Without a sufficient minimum amount of buffering, the peaks 121 (FIG. 1B) of the media file 104 will not be continuously played back on the display device 112. Therefore, if a user were to skip to a different point in the media file 104 and a sufficient amount of the media file 104 had not buffered to the user media device 108, continuous playback of media file 104 will be interrupted.

Embodiments of the systems and methods described herein allow for the uninterrupted VBR playback of a media file, such as the media file 104, by buffering a minimum amount of the media file 104 to the user media device 108, such as a STB, DVR, modem, computing device, etc. That is, upon the execution of a trick play, such as a skip or selection of a particular chapter of a movie, a portion of the VBR media file 104 beginning at the selected access point may be transmitted as a CBR flow to the user media device 108 before playback of the media file 104 to the display device 112 begins. After the minimum amount of the media file 104 is buffered to the user media device 108, the playback may begin as a VBR flow from the user media device 108 to the display device 112 without the possibility of the buffer emptying.

The minimum amount of the media file 104 refers to a minimum amount of the media file 104 required to ensure that the media file 104 is played back continuously and uninterruptedly as a VBR flow on the display device 112 without the buffer emptying. As set forth above, if the media file 104 is played back immediately as it is transmitted from the head-end 102 without sufficient buffering, playback of the media fie 104 may be interrupted. For instance, if portions of the media file 104 having peaks 121 (FIG. 1B), which exceed the bandwidth cap 123 are played back immediately without the minimum amount of buffering, playback of the media file 104 may become interrupted. This often results in an unpleasant viewing experience.

However, by buffering the minimum amount of the media file 104 to the user media device 108, the systems and methods described herein substantially ensure that the media file 104 is played back continuously and uninterruptedly from any access point in a media file 104 without excessive buffering. "Excessive buffering" generally refers to the transfer of more than the minimum amount of the media file 104 than necessary to ensure continuous and uninterrupted VBR playback of the media file 104, as it is transmitted to the user media device 108 as a CBR flow. Excessive buffering results in wasted storage space on the user media device 108, because more of the media file 104 is stored on the user media device 108. In addition, excessive buffering before playback of the media file 104 begins means that a user must wait an unnecessary duration of time for an excessive amount of the media file 104 to download before beginning playback of the media file 104.

The embodiments described herein allow for time and bandwidth efficient systems and methods for the transmission and playback of a media file 104 that provides functionality similar to a digital video disc (DVD) player, because a user may perform time shifting trick plays as if the user were interacting with a DVD player. This is because the minimum buffer values for each access point available during the execution of a trick play may be determined before the user executes the trick play. According to an embodiment, the systems and methods described herein may not require the effort and expense of obtaining additional hardware and media equipment by a user or subscriber. The access points and the minimum amount of buffering may be determined and stored upstream from the user or subscriber and implemented automatically upon execution of a trick play.

Figure 2:
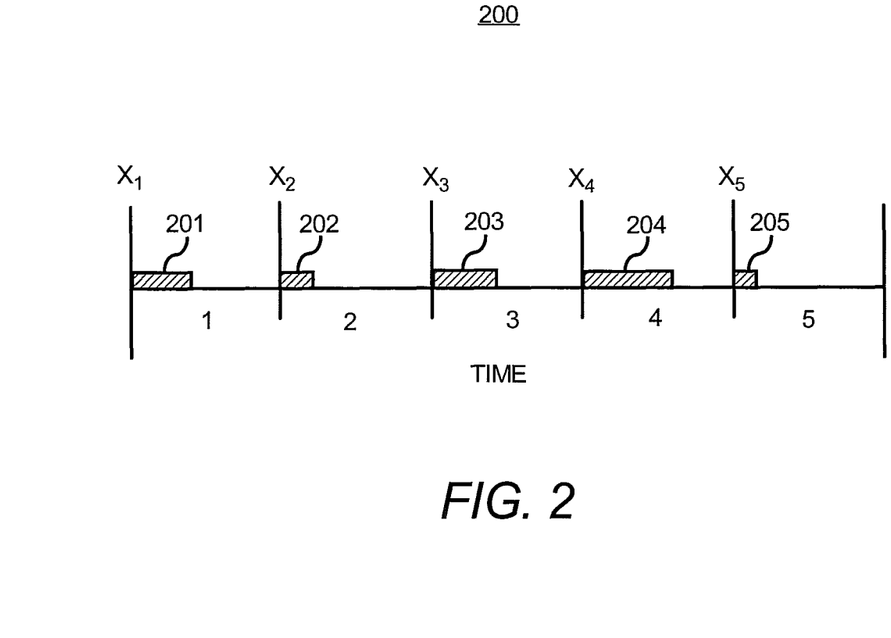
FIG. 2 illustrates a simplified diagram of a media file having a plurality of access points, according to an embodiment of the invention.

With reference to FIG. 2, there is shown a simplified diagram of a media file 200 having a plurality of access points, according to an example. The horizontal axis of the media file 200 represents time in a continuous spectrum. It should be understood that the following description of the media file 200 is but one manner of a variety of different manners in which such a media file 200 may be divided and that the media file 200 may have many different configurations. In addition, it should be understood that the media file 200 may include additional features and that some of the features described may be removed and/or modified without departing from a scope of the media file 200.

The media file 200 is divided into a plurality of segments, labeled sequentially 1-5. The plurality of segments may represent any logical and/or random divisions in the media file 200. For example, the different segments may represent different chapters or scenes of related media content. While five different segments are shown in FIG. 2, a person having ordinary skill in the art will appreciate that the media file 200 may have any reasonably suitable number of segments. The segments may be determined by a creator and/or distributor of the media file 200 or may be determined by the MSO or another entity upstream from a user or subscriber within a media distribution network. For example, the segments may be determined at the head-end 102. In one embodiment, the length of the segments may be determined automatically based on a predetermined distance between segments. However, while segments of equal length are shown in FIG. 2, a person having ordinary skill in the art will appreciate the segments may have any reasonably suitable different lengths with respect to each other.

The segments also include a plurality of access points, labeled $X_1$-$X_5$, which correspond substantially to a beginning of each of the segments 1-5, respectively. In this manner, a user may execute a trick play to begin playback of the media file 200 from any of the access points. For example, a user may select a skip or fast forward command on an input control device to select between the different access points. Alternatively, or in addition thereto, a user may select the access points from a menu or other similar presentation.

The media file 200 also shows a plurality of minimum buffer values 201-205 for each of the access points, $X_1$-$X_5$, respectively. As described above, the minimum buffer values 201-205 represent a minimum amount of the media file 200, which may be buffered to a user media device as a CBR flow to ensure uninterrupted VBR playback of the media file 200 from each of the respective access points 201-205. The minimum buffer values 201-205 may be quantified in terms of an amount of time needed for the media file 200 to buffer, an amount of time into the media content of the media file which is buffered, or an amount of data, such as bytes, as will be described in greater detail below.

For example, if the access point $X_4$ is selected, the minimum amount of buffering is represented by the minimum buffer value 204. Therefore, playback of the media file 200 from the access point $X_4$ to a display device will not begin until the minimum amount of buffering 204 has completed, which may be any reasonably suitable durations of time, such as 1-5 seconds, for instance. However, if the access point X5 is selected, the minimum amount of buffering 205, shown in FIG. 2 is considerably shorter. For example, the minimum amount of buffering for the playback of segment 5 may be less than a second. As described above, the difference in minimum buffer values may be due to the different levels of bandwidth required for the media content in each segment of the media file 200. That is, because the media file 200 is played back in VBR format, segment 4, for instance, may contain higher bandwidth media content, such as action scene, explosions, etc, as compared to segment 5. Therefore, additional buffering of segment 4 is required before playback of segment 4 begins to ensure that segment 4 and the remainder of the media file 200 following segment 4 is transmitted as a CBR flow, but played back continuously and uninterruptedly as a VBR flow.

As FIG. 2 shows, the minimum buffer values 201-205 may vary between access points or may be substantially similar depending upon the bandwidth required for the media content contained within each segment. The minimum buffer values may have any reasonably suitable duration. Also, it should be understood that the media file 200 may represent only a portion of a media file and that the media file 200 may be any reasonably suitable length and have any reasonably suitable number of access points.

The minimum buffer values, $\text{Buffer}_{min}$, may be expressed in terms of either playback time into the video, $t_V$, that is contained in the buffer, or in terms of the amount of time for which the video has been downloading into the buffer, $t_{S,Buffer}$. Note, the following relationship expresses the amount of buffered material in terms of these two variables.

$$\text{Buffer}_{min} = \int_{t=0}^{t_{V,Buffer}} B(t_V) dt_V \qquad \text{Equation (1)}$$
$$= B_{download} * t_{S,Buffer}.$$

In the formula set forth above $t_{S,Buffer}$ is system time, which is a continuous time measurement from the beginning of a media file download until the minimum buffer amount has been downloaded. Therefore, $t_S=0.0$ at the beginning of a buffering process when an access point is selected.

The parameter $t_{V,Buffer}$ is video time, which is an amount of time into the media file beginning at the point into the media file at which playback begins. Accordingly, if Is playback begins at the very beginning of a media file, and if 30 minutes of the media file has been played back then $t_V=30$ mins. On the other hand, if a fast forward command is executed to begin playback at a point 20 mins into the media file, and the file has been playing from that starting point for 10 minutes, then $t_V=10$ min. In these two cases the video is currently playing at the same point in the media file, 30 min from the beginning. So, the same location in the media file could be $t_V=30$ min or $t_V=10$ min., depending on where playback begins. The reason for defining $t_V$ in this manner is to simplify the later calculations for minimum buffer size for trick plays.

The parameter B represents bandwidth and $B_{download}$ refers to the bandwidth at which a media file is transmitted to a user media device. In an embodiment, $B_{download}$ may remain constant, because the media file is transmitted as a CBR flow. The parameter $t_S$ refers to the amount of time that the media file has been transmitted or an amount of time since the media file has started to download. In one case, if a media file is transmitted from the beginning of the media file, then the media file download starts at system time $t_s=0$. As the media file continues to transmit or download, the system time $t_S$ advances from 0. If, on the other hand, a trick play is executed to access a point later in the media file, $t_S$ again measures the time from the beginning of the download. The difference between these cases is that the download begins with material starting at the chosen access point in the media file rather than material from the beginning of the media file.

Video time, $t_V$ does not begin advancing until playback of the media file begins. Therefore, as the media file buffers to the user media device, $t_V$ remains at zero. As such, at system time $t_s$, the buffer has filled by an amount measured by the formula:

$$(B_{download} * t_S). \qquad \text{Equation (2):}$$

In order to calculate the necessary amount of buffered material, another expression is used. For instance, a minimum amount of video material in the media file needs to be downloaded before playback of the media file begins. Therefore, $t_{S,Buffer}$ is the amount of time required to download this minimal amount of buffered material. The actual amount of material, measured in Bytes, will be:

$$(B_{download} * t_{S,Buffer}). \qquad \text{Equation (3):}$$

The amount of video time, $t_{V,Buffer}$, that is contained in this buffered material is given by the following relation:

$$\text{Initial\_Buffer} = \int_{t=0}^{t_{V,Buffer}} B(t_V) dt_V \qquad \text{Equation (4)}$$
$$= B_{download} * t_{S,Buffer}.$$

Where the buffered media file would be consumed at the instantaneous rate of $B(t_V)$.

When playback of the media file begins, video time is just starting, $t_V=0$, while the system time has reached the value, $t_S=t_{S,Buffer}$, as described by the following formula:

$$t_V=0=t_S-t_{S,Buffer} \qquad \text{Equation (5):}$$

The video time and the system time are both increasing at the same rate and they are related by the above relation. To determine how much additional material has downloaded since the playback started, the following formula may be used:

$$\text{download}(t_V) = B_{download} * t_V \qquad \text{Equation (6):}$$

Also starting from time, $t_V=0$, the amount of material that is consumed is $$\text{consumed}(t_V) = \int_{t=0}^{t_V} B(t_V)\, dt_V. \qquad \text{Equation (7)}$$

The following formula may need to be satisfied to ensure the buffer does not empty:

$$\text{Initial\_Buffer} + \text{download}(t_V) - \text{consumed}(t_V) \geq 0 \qquad \text{Equation (8):}$$

This formula becomes:

$$\text{Initial\_Buffer} + B_{download} * t_V - \int_{t=0}^{t_V} B(t_V)\, dt_V \geq 0. \qquad \text{Equation (9)}$$

By having prior knowledge of the instantaneous bandwidth of the media file, $B(t_V)$, it is possible to solve this equation for various values of download bandwidth, $B_{download}$, and for various access points in the media file. According to one embodiment, these determinations may be performed by a computer program prior to loading the media file into a media server, such as a video server at a head-end of an HFC network. The relation between bandwidth, buffer time, buffer amount, etc. may be determined separately, in advance, for each access point in a media file. In this way, the necessary buffer sizes can be pre-determined for the various access points in the media file. Higher values of the download bandwidth, $B_{download}$, result in smaller buffer times and the amount of material that needs to be buffered.

The user media device may delay playback of the media file until the minimum amount of buffering has completed through any reasonably suitable manner. For instance, a signal may be transmitted with the media file which instructs the user media device to delay playback of the media file until the minimum amount of the media file has buffered to the user media device.

In an embodiment, the user may be presented with a blank or black screen IS displayed on the display device while the minimum amount of the media file from each access point is buffered. However, in other embodiments, replacement media content may be presented to a user during buffering. The replacement media content may be audio, video, and/or still images, which may be transmitted to a user media device or pre-stored at the user media device. For example, in one embodiment, an advertisement or similar material may be transmitted to the user media device and played back or displayed on the display device during the buffering of the minimum amount of the media file.

Figure 3:
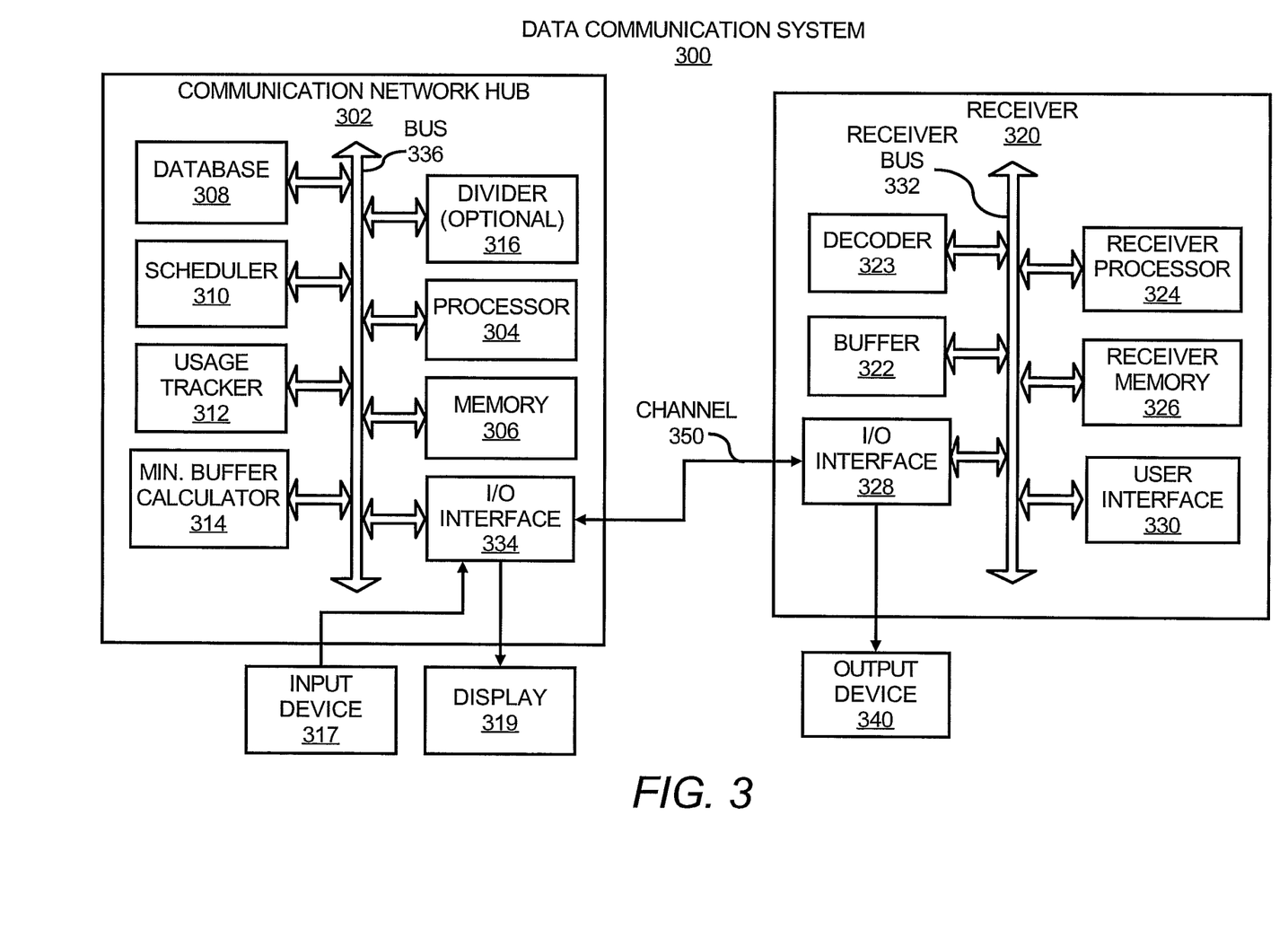
FIG. 3 illustrates a block diagram of data communication system, according to an embodiment of the invention.

With particular reference now to FIG. 3, there is shown a simplified block diagram of a data communication system 300, according to an example. It should be understood that the following description of the data communication system 300 is but one manner of a variety of different manners in which such a data communication system 300 may be configured and operated. In addition, it should be understood that the data communication system 300 may include additional components and that some of the components described may be removed and/or modified without departing from a scope of the data communication system 300.

The data communication system 300 includes a communication network hub 302 and a receiver 320 connected via a channel 350. The communication network hub may be located at the head-end 102 and the receiver 320 may be substantially equivalent to the user media device 108, both of which are described above, with respect to FIG. 1A. Therefore, the channel 350 may include an HFC and/or an IP network for transmitting a media file 104.

The communication network hub 302 is depicted as including a processor 304, a memory 306, a database 308, a scheduler 310, a usage tracker 312, an input/output (I/O) interface 314, and a bus 316. The processor 304 is configured to perform various functions in the communication network hub 302, such as, to fulfill requests for media files, to track locations of media files, to vary the rates at which media files are communicated to the receiver 320, etc. In this regard, the processor 304 may comprise a microprocessor, a micro-controller, an application specific integrated circuit (ASIC), and the like, configured to perform various processing functions.

The memory 306 is configured to provide storage of software, algorithms, and the like, that provide the functionality of the processor 304. By way of example, the memory 306 may store an operating system, application programs, program data, and the like. In this regard, the memory 306 may be implemented as a combination of volatile and non-volatile memory, such as DRAM, EEPROM, MRAM, flash memory, and the like. In addition, or alternatively, the memory 306 may comprise a device configured to read from and write to a removable media, such as, a floppy disk, a CD-ROM, a DVD-ROM, or other optical or magnetic media.

The database 308 may store a plurality of data files, such as the media file 104, in encoded or unencoded format. The communication network hub 302 may comprise a video on demand (VOD) server, which enables users to interact with the communication network hub 302 to thereby request and receive desired data files. Although the database 308 has been depicted as forming an element separate from the memory 306, it should be understood that the database 308 may form part of the memory 306 without departing from a scope of the invention.

In any regard, the database 308, or another database (not shown), may store additional information pertaining to the receiver 320 and the channel 350 between the communication network hub 302 and the receiver 320. For instance, the database 308 may store information pertaining to the size of the buffer 322 in the receiver 320, the programming which the receiver 320 is authorized to receive, the bandwidth available or allotted between the communication network hub 302 and the receiver 320 across the channel 350, etc. The communication network hub 302 may receive this information from the receiver 320 when the receiver 320 is initially activated and paired with the communication network hub 302 or this information may be received from the receiver 320 at various intervals of time.

The scheduler 310 is configured to indicate the timing and the rates at which various content are to be communicated to the receiver 320. More particularly, for instance, the scheduler 1310 may indicate that particular programs stored in the database 308 are to be communicated to the receiver 320 at a particular time (t) according to, for instance, the programs the receiver 320 is authorized to receive. In this regard, the communication network hub 302 may be configured to communicate content in addition to VOD content, such as, regularly scheduled programming.

The scheduler 310 may also reserve respective bandwidths on the channel 350 for data files that are to be communicated to the receiver 320. For instance, the scheduler 310 is configured to schedule the total bandwidth usage in the channel 350 by one or more data file flows at any given time. In addition, in order to preserve the bandwidth usages and to substantially avoid the problems associated with statistical multiplexing, the scheduler 310 is configured to schedule communication of the one or more data files 305 such that they are communicated at rates equal to at least minimum constant bit rates for each of one or more data files. The scheduler 310 may calculate the minimum constant bit rates for each of the one or more data files based upon a number of factors prior to transferring the data files as is known in the art.

As such, the scheduler 310 is further configured to calculate reserve minimum constant bit rates in the channel 350 for the communication of one or more data files such that they are transferred at sufficiently fast rates to enable the data to be replayed without the buffer 322 emptying prematurely.

The usage tracker 312 is configured to track the amount of bandwidth being used by each of the data files being communicated to the receiver 320 at a given time. The usage tracker 312 may also track additional information transmitted over the channel 350, such as, voice, data, IP multicast, etc.

Although the scheduler 310 and the usage tracker 312 have been depicted as separate elements, the scheduler 310 and the usage tracker 312 may comprise a single hardware or software component. Alternatively, either or both of the scheduler 310 and the usage tracker 312 may comprise software stored, for instance, in the memory 306, which are executable by the processor 304.

In any regard, the scheduler 310 is further configured to increase the rate at which at least one current data file 305 is transferred above the minimum constant bit rate for the at least one current data file, when there is sufficient bandwidth available for the increase. As such, additional content of the at least one current data file may be transferred to the receiver 320 at an earlier time. The scheduler 310 may track the amount (for instance, in the number of bits) of additional content that has been transferred to the receiver 320. The scheduler 310 may additionally decrease the rate at which the at least one current data file is transferred to thereby make additional bandwidth available for the admission of a new data file.

The communication network hub 302 also includes a minimum buffer calculator 314, which is configured to determine minimum buffer values at various access points within a media file. For example, the minimum buffer calculator 314 may be Is configured to calculate the minimum buffer values 201-205 for the media file 200, described above with respect to FIG. 2. As such, the minimum buffer calculator 314 may store and perform calculations using the formulas set forth above for various access points. For instance, the minimum buffer calculator 314 may receive an indication of an available amount of bandwidth from the usage tracker 312 and determine an amount of time a segment of a media file needs to buffer if the segment is selected by a user through the execution of a trick play.

In an embodiment, the minimum buffer calculator 314 may determine a table of values. The table may include two or more of the variables described in the formulas above. For example, the table may include a minimum time and/or a minimum amount of data needed for a segment to buffer at different bandwidths. The values determined by the minimum buffer calculator 314 may be stored in the memory 306 or in the database 308 with the media files.

The communication network hub 302 may include an optional divider 316, which may be configured to determine the locations of access points within a media file. For example, the divider 316 may divide the media file 200 into the segments 1-5, thereby determining the access points X1-X5. As mentioned above, the divider 316 may divide the media file into segments based on any reasonably suitable factors, such as a predetermined distance between access points or a correspondence to the media content within the media file, such as scene changes and chapters. Alternatively, or in addition thereto, media files may be pre-divided into segments before the media files reach the communication network hub 302.

A user may interface with the communication network hub 302 through an input device 317, such as, a keyboard, buttons, a mouse, a stylus, and the like. In addition, the user may receive information from the communication network hub 302 through a display 319. As shown, the input device 317 and the display 319 are in communication with the communication network hub 302 through the I/O interface 314.

In any regard, the processor 304 may invoke or implement the scheduler 310, the divider 316, the minimum buffer calculator 314, and the usage tracker 312 in controlling the transfer of data files stored in the database 308, such as, videos, images, sound, voice, data, etc., to the receiver 320. As shown, data is communicated between the various components of the communication network hub 302 through a bus 316, which may include, for instance, a circuit board having connections onto which each of the communication network hub components is attached. In addition, or alternatively, the bus 316 may include networking equipment into which some or all of the communication network hub components are connected.

The I/O interface 314 may comprise one or both of any reasonably suitable known hardware and software that facilitates communication of information between the communication network hub 302 and the receiver 320. In addition, the processor 304 may implement the I/O interface 314 to communicate with the receiver 320. The receiver 320 is depicted as also including an I/O interface 328 and may comprise one or both of any reasonably suitable known hardware and software that facilitates communication of information between the receiver 320 and the communication network hub 302.

The I/O interfaces 314 and 328 are configured to enable the communication network hub 302 and the receiver 320 to communicate through either a wired or a wireless connection.

The receiver 320 includes the buffer 322 and the I/O interface 328 as discussed above, and also includes a receiver processor 324, a receiver memory 326, a user interface 330, and a receiver bus 332. The receiver processor 324 is configured to perform various functions in the receiver 320, such as, to transmit requests for data files to the communication network hub 302, to track the receipt of the data files received and stored in the buffer 322, to decode encoded data files, to control playback of data on the output device 340, etc. In one regard, the receiver processor 324 may comprise a microprocessor, a micro-controller, an application specific integrated circuit (ASIC), and the like, configured to perform the above-described and additional processing functions.

The receiver memory 326 is configured to provide storage of software, algorithms, and the like, that provide the functionality of the receiver processor 326. By way of example, the receiver memory 326 may store an operating system, application programs, program data, and the like. In this regard, the receiver memory 326 may be implemented as a combination of volatile and non-volatile memory, such as DRAM, EEPROM, MRAM, flash memory, and the like. In addition, or alternatively, the receiver memory 326 may comprise a device configured to read from and write to a removable media, such as, a floppy disk, a CD-ROM, a DVD-ROM, or other optical or magnetic media.

The buffer 322 is configured to store file data, such as the media files 104 and 200, communicated to the receiver 320 from the communication network hub 302 prior to the play back of the data files on the output device 340, which may be include the display device 112, described above with respect to FIG. 1A. In one regard, the buffer 322 may comprise a data storage device, such as, RAM, ROM, EPROM, EEPROM, magnetic or optical disks or tapes, a DVR (digital video recorder), etc. In addition, the buffer 322 may have sufficient capacity to enable storage thereon of at least a portion of the data files. The receiver processor 324 is also configured to decode the data files stored in the buffer 322 in order for the data files to be in compliant form to be played back on the output device 340. The receiver processor 324 is further configured to determine when to begin playback of the data files after a minimum amount of the data files is stored in the buffer 322. For example, the receiver processor 324 may recognize and implement a signal received from the communication network hub 302 instructing the receiver 320 to delay play back of the data files while a minimum amount of the data files is buffered.

The user interface 330 generally provides users with the ability to control the receiver 320. For instance, the user interface 330 may enable users to control the receiver 320 to thereby manipulate the data files played back on the output device 340, including, selection of the program to be viewed as well as control over the playback of the selected program. In this regard, the user interface 330 may comprise various controls placed on the receiver 320 or the user interface 330 may enable the receiver 320 to be connected with a remote device configured with the various controls.

As shown, the receiver processor 324 may receive signals from the user interface 330 through the receiver bus 332. The receiver bus 332 may include, for instance, a circuit board having connections onto which each of the components of the receiver 320 is attached. In addition, or alternatively, the receiver bus 332 may include networking equipment into which some or all of the components of the receiver 320 are connected.

The receiver processor 324 may also receive data communicated from the communication network hub 302 through the I/O interface 328 over the receiver bus 332. The data received from the communication network hub 302 may include, for instance, information pertaining to the data files being communicated into the buffer 322. This information may include, for instance, the titles of the data files, one or more timestamps associated with the data files, etc. In an embodiment, the receiver 320 may receive and transmit to the output device 340 a menu showing various access points from which a user may select.

In operation, because the data files are stored in the buffer 322 prior to being played by the receiver 320, the playback time-base of the data files is decoupled from the transfer rate of the data files. In this regard, the data files may be stored as variable bit rate (VBR) videos. However, the communication network hub 302 may transfer the VBR video data files at constant bit rates because the playback of the data files and the transfer of the data files are decoupled from each other, as described above.

Figure 4:
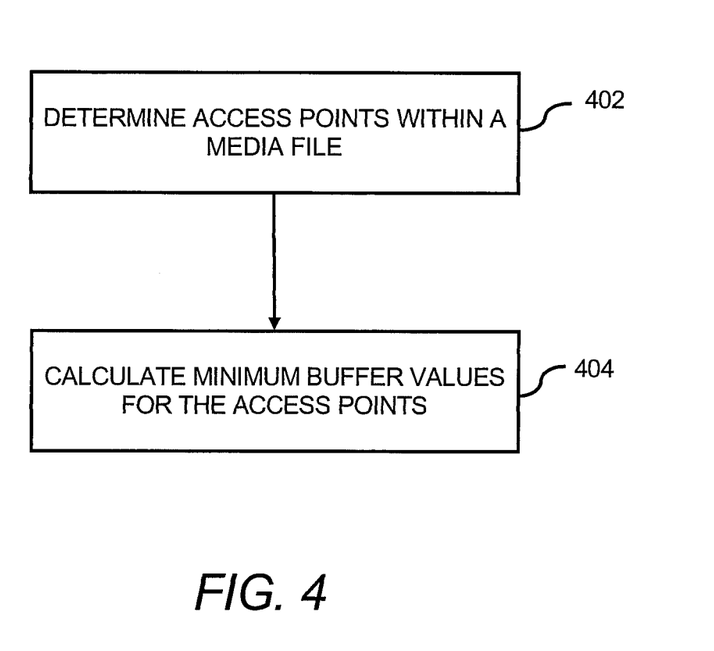
FIG. 4 illustrates a flow chart of a method for enabling trick plays during the VBR playback of media content transmitted as a CBR flow, according to an embodiment of the invention.

With respect first to FIG. 4, there is shown a flow diagram of a method 400 for calculating minimum buffer values, according to an example. It is to be understood that the following description of the method 400 is but one manner of a variety of different manners in which examples of the data communication system 300 depicted in FIG. 3 may be practiced. It should also be apparent to those of ordinary skill in the art that the method 400 represents a generalized illustration and that other steps may be added or existing steps may be removed, modified or rearranged without departing from a scope of the method 400.

The method 400 is described with respect to FIGS. 1A, 1B, 2, and 3 by way of example and not of limitation. It will thus be apparent to one of ordinary skill in the art, that the method 400 may be performed with systems other than the data communication system 300 depicted in FIG. 3.

At step 402, a plurality of access points within the media file are determined. As set forth above, the access points are locations within the media file from which playback of the media file may begin. The access points may be previously defined by a creator, distributor, etc. of the media file before the media file reaches an HFC or IP network. Alternatively, or in addition thereto, the access points may be defined by the divider 316.

At step 404, minimum buffer value for each of the plurality of access points are calculated. As set forth above, minimum buffer value identify a minimum amount of the media file to transmit to the user media device before beginning playback of the media file from each of the plurality of access points to ensure that the media file is configured to be played back from each of the plurality of access points continuously and uninterrupted at a variable bit rate.

The minimum buffer values may be calculated using the formulas set forth above. For example, a download bandwidth for transmitting the media file as a CBR flow may be determined. With this bandwidth, the duration of time in which the video file is buffered may be determined. Alternatively, or in addition thereto, the duration of time into the media content of the media file in which the media file may be buffered and/or an amount of data of the media file to be buffered may be determined. One or more of the these values may be determined for a plurality of different bandwidths.

One or more of the steps of the method 400 and other steps described herein and software described herein may be implemented as software embedded or stored on a computer readable medium, such as the memory 306, and executed by the processor 304. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM, ROM, EPROM, EEPROM, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

Through implementation of the systems and methods disclosed herein, trick plays may be enabled during the transfer of a VBR media file as a CBR flow. The embodiments described herein allow for the continuous and uninterrupted VBR playback of the media file from any selected access point. Moreover, although a user may have to wait for a minimum amount of buffering to occur, the user does not have to wait an excessive duration of time, because substantial overbuffering is prevented. Therefore, the embodiments described herein effectively simulate the experience of interacting with a DVD player with streaming media content, such as VoD services.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method for enabling trick plays during a variable bit rate (VBR) playback of a media file transmitted to a user media device as a constant bit rate (CBR) flow, said method comprising:
   determining a plurality of access points within the media file, wherein the media file is configured to be played back from each of the plurality of access points, each of the plurality of access points being associated with a scene of a plurality of scenes of the media file;
   calculating a minimum buffer value for each of the plurality of access points, wherein the minimum buffer value identifies a minimum amount of the media file to transmit to the user media device before beginning playback of the media file by the user media device from each of the plurality of access points to substantially ensure that the media file is configured to be played back by the user media device from each of the plurality of access points continuously and uninterruptedly at a variable bit rate;
   receiving a user selection of an access point of the plurality of access points, wherein the user selection represents a scene chosen by the user from the plurality of scenes; and
   transmitting the minimum amount of the media file from the selected access point to the user media device before playback of the media file from the selected access point begins.

2. The method of claim 1, further comprising:
   storing the minimum buffer values for each of the plurality of access points with the media file.

3. The method of claim 1, further comprising:
   transmitting a control signal to the user media device while transmitting the minimum amount of the media file, wherein the control signal instructs the user media device to delay playback of the media file until the minimum amount of the media file has buffered to the user media device.

4. The method of claim 1, further comprising:
   transmitting an additional amount of the media file to the user media device after playback of the media file has begun from the selected one of the plurality of access points.

5. The method of claim 1, wherein transmitting the minimum amount of the media file to the user media device comprises transmitting the media file downstream in a hybrid fiber-coaxial cable (HFC) network to the user media device.

6. The method of claim 1, wherein transmitting the minimum amount of the media file to the user media device comprises transmitting the media file as a CBR flow and playing back the media file from the user media device to a display device as a VBR flow.

7. The method of claim 1, wherein determining a plurality of access points comprises at least one of:
   identifying access points which have been previously determined; and
   dividing the media file into segments, wherein a beginning of each of the segments substantially corresponds to an access point.

8. The method of claim 1, wherein calculating a minimum buffer value for each of the plurality of access point further comprises:
   determining a download bandwidth for the media file as a CBR flow; and
   determining a duration of time to buffer the media file before beginning playback of the media file from each of the plurality of access points.

9. The method of claim 1, wherein calculating a minimum buffer value for each of the plurality of access point further comprises:
   determining multiple download bandwidths for the media file as a CBR flow; and
   determining a duration of time to buffer the media file for each of the multiple download bandwidths before beginning playback of the media file from each of the plurality of access points.

10. The method of claim 1, further comprising:
    receiving a request for the media file through a video on demand (VoD) service.

11. A system for enabling trick plays during a VBR playback of a media file transmitted to a user media device as a CBR flow comprising:
    a minimum buffer calculator operable to calculate minimum buffer values for each of a plurality of access points within the media file, wherein the minimum buffer value identifies a minimum amount of the media file to transmit to the user media device before beginning playback of the media file by the user media device from each of the plurality of access points to ensure that the media file is configured to be played back by the user media device from each of the plurality of access points continuously and uninterrupted at a variable bit rate;
    a divider operable to divide the media file into a plurality of segments, wherein each of the plurality of access points represents a scene of a plurality of scenes of the media file, and substantially corresponds to a beginning of a segment of the plurality of segments,
    wherein each of the plurality of scenes is selectable by a user to begin playback of the media file from the access point representing the selected scene,
    wherein the system receives a user selection of an access point of the plurality of access points, wherein the user selection represents a scene chosen by the user from the plurality of scenes; and
    wherein the system transmits the minimum amount of the media file from the selected access point to the user media device before playback of the media file from the selected access point begins.

12. The system of claim 11, wherein the user media device includes at least one of a STB and a DVR and, wherein the media file is configured to be transmitted downstream over an HFC network to the user media device as a CBR flow and played back from the user media device to a display device as a VBR flow.

13. The system of claim 11, wherein minimum buffer values include a download bandwidth for the media file as a CBR flow and a duration of time to buffer the media file before beginning playback of the media file from each of the plurality of access points.

14. The system of claim 11, further comprising:
a storage device configured to store the media file and the minimum buffer values with the media file.

15. The system of claim 11, wherein the media file is selected by a user through a VoD service.

16. A non-transitory computer readable medium storing one or more computer programs including instructions that when executed perform a method of enabling trick plays during a VBR playback of a media file transmitted to a user media device as a CBR flow, the method comprising:
determining a plurality of access points within the media file, wherein the media file is configured to be played back from each of the plurality of access points, each of the plurality of access points being associated with a scene of a plurality of scenes of the media file;
calculating a minimum buffer value for each of the plurality of access points, wherein the minimum buffer value identifies a minimum amount of the media file to transmit to the user media device before beginning playback of the media file by the user media device from each of the plurality of access points to ensure that the media file is played back by the user media device from each of the plurality of access points continuously and uninterrupted at a variable bit rate;
receiving a user selection of an access point of the plurality of access points, wherein the user selection represents a scene chosen by the user from the plurality of scenes; and
transmitting the minimum amount of the media file from the selected access point to the user media device before playback of the media file from the selected access point begins.

17. The non-transitory computer readable medium of claim 16, the method further comprises:
determining a download bandwidth for the media file as a CBR flow; and
determining a duration of time to buffer the media file before beginning playback of the media file from each of the plurality of access points.

\* \* \* \* \*